No. 852,417. PATENTED MAY 7, 1907.
F. CAMPBELL & G. E. WILSON.
STOCK CAR.
APPLICATION FILED MAY 25, 1906.
3 SHEETS—SHEET 1.
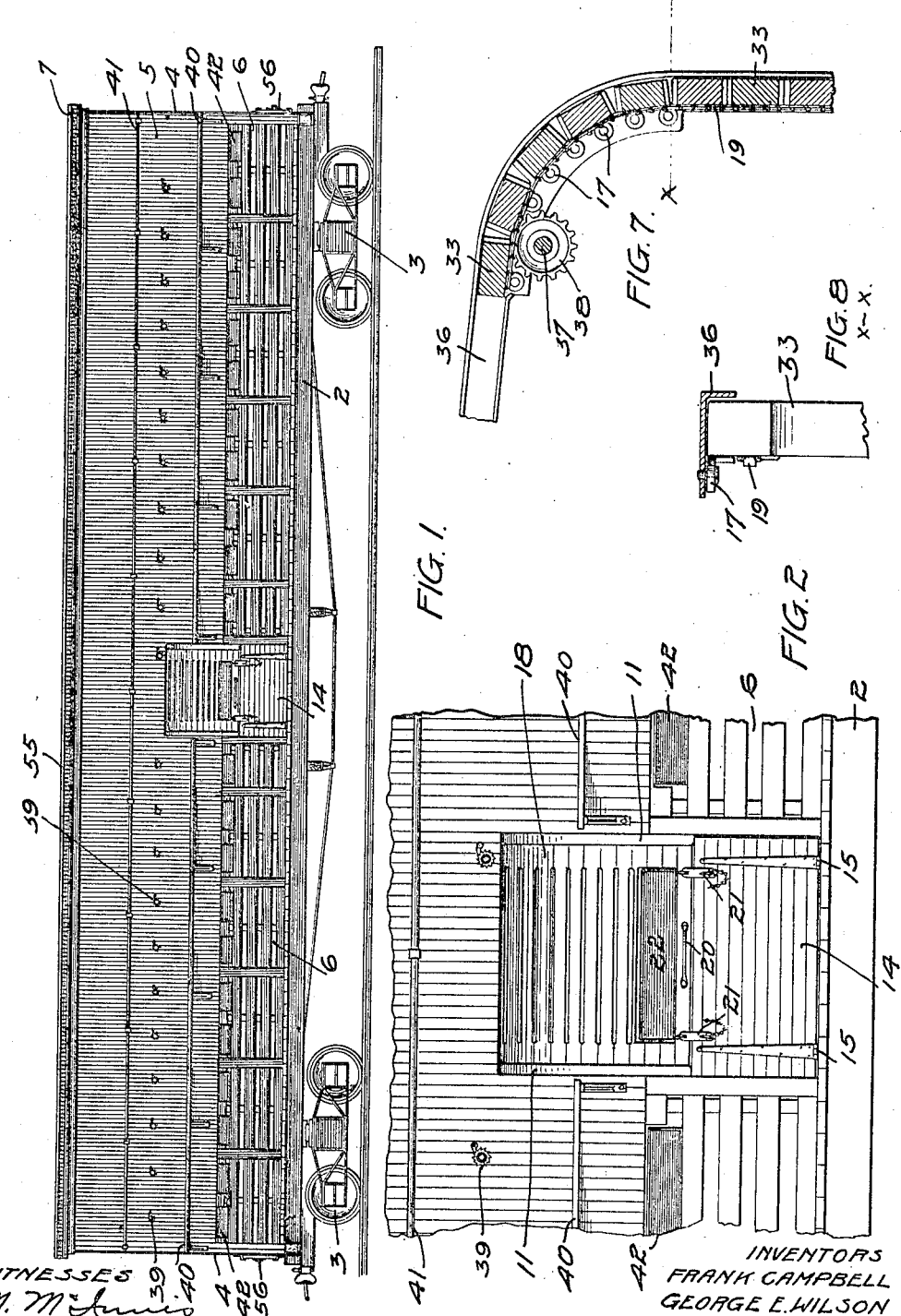
WITNESSES
M. McInnis
J. H. Baldwin
INVENTORS
FRANK CAMPBELL
GEORGE E. WILSON
BY
Paul & Paul
THEIR ATTORNEYS No. 852,417. PATENTED MAY 7, 1907.
F. CAMPBELL & G. E. WILSON.
STOCK CAR.
APPLICATION FILED MAY 25, 1906.

3 SHEETS—SHEET 2.

WITNESSES
INVENTORS
FRANK CAMPBELL
GEORGE E. WILSON
BY
THEIR ATTORNEYS

No. 852,417. PATENTED MAY 7, 1907.
F. CAMPBELL & G. E. WILSON.
STOCK CAR.
APPLICATION FILED MAY 25, 1906.

3 SHEETS—SHEET 3.

WITNESSES
M. M. Irwin
J. H. Baldwin

INVENTORS
FRANK CAMPBELL
GEORGE E. WILSON
BY
Paul & Paul
THEIR ATTORNEYS

THE NORRIS PETERS CO., WASHINGTON, D. C.

UNITED STATES PATENT OFFICE.

FRANK CAMPBELL AND GEORGE E. WILSON, OF STILLWATER, MINNESOTA.

STOCK-CAR.

No. 852,417.  Specification of Letters Patent.  Patented May 7, 1907.

Application filed May 25, 1906. Serial No. 318,660.

*To all whom it may concern:*

Be it known that we, FRANK CAMPBELL and GEORGE E. WILSON, of Stillwater, Washington county, State of Minnesota, have invented certain new and useful Improvements in Stock-Cars, of which the following is a specification.

Our invention relates to improvements in cars designed for the transportation of stock.

The object of our invention is to provide a car which can be easily and quickly divided off into stalls each adapted to contain one animal.

A further object is to provide a stock car having conveniently arranged devices for feeding and watering the stock.

A further object is to provide a car which will allow convenient access to the stalls and the animals therein.

Other objects of the invention will appear from the following detailed description.

The invention consists generally in providing a series of transversely arranged stalls having movable partitions or curtains between them.

Further, the invention consists in an improved form of side door.

Further, the invention consists in improved devices whereby feed and water may be accessible to the animal in each stall.

Further, the invention consists in providing a car with water reservoirs or tanks and with an apartment wherein hay and other feed may be stored.

Further, the invention consists in various constructions and combinations all as hereinafter described and particularly pointed out in the claims.

Figure 3:
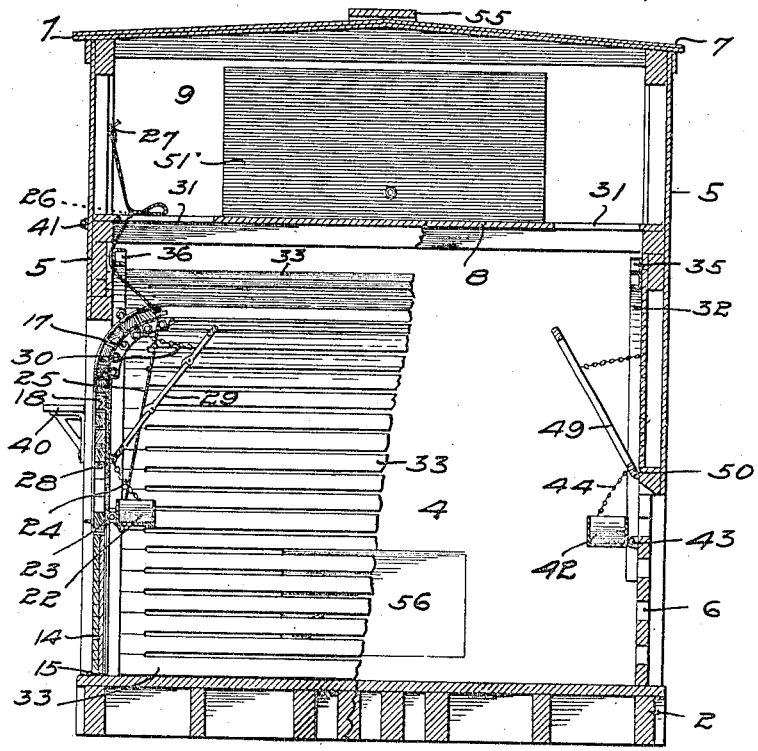
Figure 4:
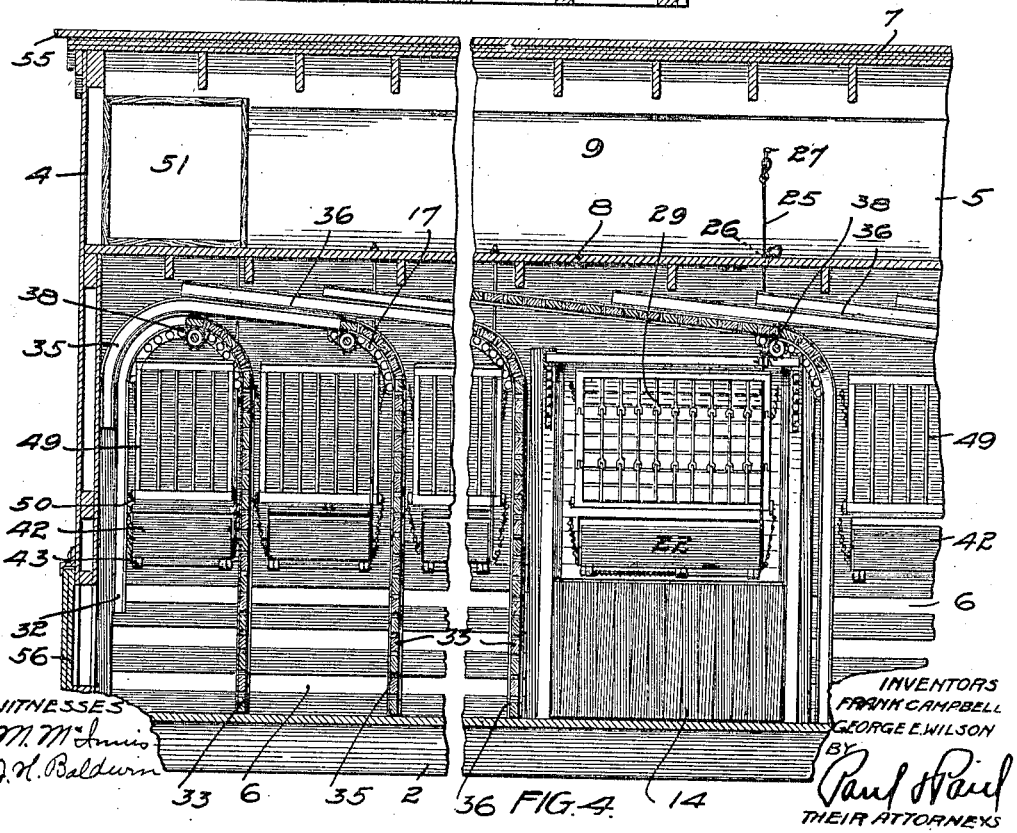
Figure 5:
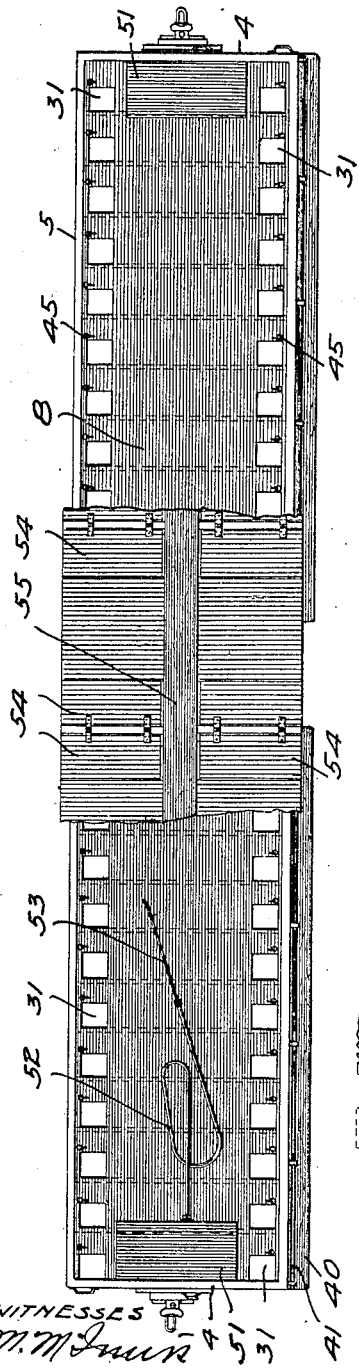
Figure 6:
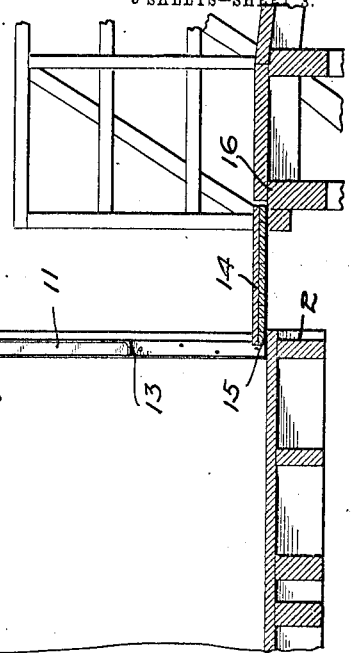
Figure 10:
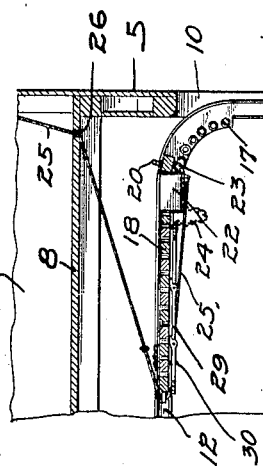
Figure 9:
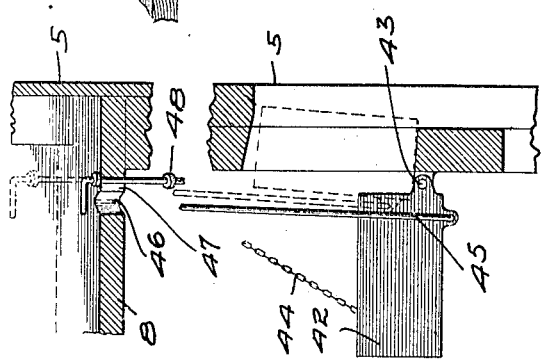

In the accompanying drawings, forming part of this specification; Figure 1 is a side elevation of a stock car embodying my invention. Fig. 2 is a view of the outside of the car showing one of the side doors in its closed position. Fig. 3 is a transverse vertical sectional view of the car. Fig. 4 is a longitudinal vertical sectional view showing the interior arrangement of the stalls. Fig. 5 is a plan view of the car, a portion of the roof at each end being broken away. Fig. 6 is a transverse sectional view showing one of the side doors in its open position and the means employed for directing the animals into the car. Fig. 7 is a detail view showing the means for raising and lowering the partitions or curtains. Fig. 8 is a sectional view on the line $x$—$x$ of Fig. 7. Fig. 9 is a detail sectional view showing the device for raising or lowering the watering trough. Fig. 10 is a detail view of the device for supporting the hay rack in its raised position.

In the drawings, 2 represents the car platform supported on the trucks 3 in the usual way. 4 represents the end walls of the car and 5 the side walls, the lower portion of which are slatted or have openings 6 as usual in cars of this kind. The upper portion of the side walls are sheathed and support the roof 7.

Within the car a horizontal floor 8 is provided dividing the interior into an upper chamber 9 used for the storage of water and feed as will hereinafter appear and the lower chamber extending to the floor of the car wherein the stalls for the animals are arranged.

On each side of the car near the middle we provide door openings 10 and on each side of said openings we provide vertical channel bars 11 secured to the door frame and having inwardly turned horizontal portions 12 at their upper ends overhanging the interior of the car. The lower portion of the outer flange on each bar is cut away as shown in Fig. 6 and the lower edge of the flange is inwardly turned to form a stop 13. The inner flanges also form stops on each side of the door openings for a trap door 14 hinged at 15 to the floor of the car and adapted to swing to a vertical position against said inner flanges and close the lower portion of the door opening. This same trap door is adapted, as shown in Fig. 6 to drop down to a horizontal position upon the gang-way 16 and temporarily form a gang-plank between said way and the floor of the car, the gang-way being the outlet of a pen located conveniently beside the track and wherein the animals are driven preparatory to loading them on the car. This trap door thus not only serves to close the lower portion of the opening into the car, but when the car is set opposite the gang-way and the trap door is lowered it allows the animals to be easily driven into the car from the pen.

The channel bars 11 are curved inwardly near the top of the door and the inner flanges are bent in to form supports for a series of anti-friction rollers 17 between which and the curved outer flanges of the channel bars, the upper portion or vertically moving part of the door is adapted to slide. This door is composed of a series of slats 18 preferably of wood having their ends flexibly connected by chains 19 (see Fig. 7). When the door is closed the lower slat rests upon the lips 13 and when open the slats are moved up to the top of the channel bars to the position indicated in Fig. 6. A suitable handle 20 is provided on the lower slat or bar for convenience in lifting the door, and locking devices 21 are provided connecting the said lower slat with the trap door 14, (see Fig. 2).

A watering trough 22 composed preferably of sheet metal is hinged at 23 on the vertically moving door and is adapted to swing on the said hinge down to a horizontal position where it will contain a supply of water within convenient reach of the animal in the stall between the doors. A chain 24 limits the downward movement of the trough and a flexible connection such as a rope 25 is attached to the said trough and extends up past the vertically moving door and through a hole 26 in the floor 8 to a point within the storage chamber where the person in charge of the car can easily reach it for the purpose of raising or lowering the trough. A pin 27 may be provided in the side of the car for convenience in fastening the rope.

A rack for hay is hinged at 28 on the car door and composed of sections 29 hinged together and adapted to be folded up against the bottom of the door when raised to the position indicated in Fig. 6, or dropped down and supported by the chain 30 in a position to receive hay as indicated in Fig. 3. Similar racks and troughs are provided on each side of the car beneath openings 31 in the floor 8 through which the attendant can easily and quickly feed and water the animals in the stalls without descending to the car floor or stopping the train.

The interior of the car is divided by vertically movable partitions into a series of transverse stalls or compartments each adapted to contain one animal, or any two or more contiguous stalls can be thrown together into one of any desired size occupying either the entire end or a portion only of the car. The stalls at each end of the car being of substantially the same construction, we will proceed to describe those in one end of the car only, it being understood that the others are practically the same.

Referring to Fig. 4, 32 represents a channel bar in the form of an inverted "U" arranged on each side of the car with one leg extending down to the floor and the other terminating at a point above the floor and being arranged close to the end wall of the car. These oppositely arranged channel bars form guide-ways for bars 33 arranged one above another therein and connected together at each end by the chains 19 and forming when joined together a flexible partition or curtain which when lowered and resting upon the car floor will separate the interior space into transverse stalls or compartments. A second pair of channel bars 35 are arranged near the bars 32 and are also "U"-shaped in form with one leg extending down to the floor of the car and the other extending toward the end of the car from the channel bars 32 and terminating a considerable distance above the floor. Within the guide-way formed by the bars 35 a partition or curtain similar to the one described is arranged and between the channel bars 34 and the middle of the car a series of channel bars 36 are provided, substantially "L"-shaped in form, having horizontal upper portions extending beneath the floor 8 and also forming guide-ways for vertically moving partitions similar to those described. All of these guide-ways have anti-friction rollers corresponding to those described with reference to the side door guide-ways and for the purpose of raising and lowering these partitions easily, we prefer to provide transverse shafts 37 having bearings in the sides of the car and provided with sprocket wheels 38 which engage the chain 19 and raise or lower the partitions as the shafts are revolved. The outer ends of the shafts are provided with ratchet devices 39 and have square ends to receive cranks which an operator standing of the shelf 40 can easily manipulate for the purpose of lowering the partition to separate one stall from another or to raise same and throw two or more stalls together. A hand rail 41 is preferably provided above the said shafts to aid the attendant in retaining his footing on the shelf 40. These partitions effectually separate one stall from another and allow the car to be divided into a series of independent compartments, each of which is capable of containing one animal. The partition when raised will be in the upper part of the car beneath the floor 8 and will not in any way interfere with the loading or unloading of the car and as fast as the animals are driven in, the partitions may be lowered, separating them until the car is full. In each stall on each side of the car we provide troughs 42 hinged at 43 and adapted to contain a supply of water when lowered to a horizontal position, being normally held in such position by chains 44 and lifted by means of rods 45 which extend up through holes 46 in the floor 8 within convenient reach of the attendant. For the purpose of holding the troughs in a raised in-operative position, as indicated by dotted lines in Fig. 9, we provide a slot 47 communicating with the hole 46 of sufficient width to allow the entrance of the rod 45 but too narrow to admit stops 48 provided on said rod above and below the floor 8. When therefore the rod 45 is pulled upward and moved laterally in the slot 47, the lower stop will rest upon the floor 8 and support the hinged trough in its raised position. A similar trough is provided on the other side of the car so that it will be immaterial which way the animal faces when driven into the stall.

Racks 49 are hinged at 50 on the side of the car and are adapted to contain a supply of hay discharged therein through the holes 31 above. Water tanks 51 are provided on each end of the floor 8 and equipped with hose 52 having pipe nozzles 53 which may be thrust down through the holes 31 to allow the troughs to be filled with water.

We have found that the use of the separate troughs for each stall instead of a continuous one running the length of the car makes it possible to water each animal independently, and there is no danger of the troughs filling up with manure or cinders as is frequently the case in stock car troughs as usually constructed. We have also found that the use of the flexible hose for filling the troughs from the tank avoids the breakage of the pipes and the escape of the water which usually follows where water pipes are conducted around the car from end to end with branch pipes to the various troughs. Freight cars are never handled very carefully and any sudden bump or shock will break the connections between such pipes and allow the water to escape. In our car with the water tank at each end, one end of the car may be smashed in and still the person in charge of the car can water and feed the stock at the other end.

Between the row of holes 31 on each side of the car the hay or other feed will be stored and doors 54 in the top of the car on each side of the walk 55 allow access to the chamber above the floor 8 whenever it is desired to take on a supply of hay, grain or water.

Suitable ventilating doors 56 are provided in the ends of the car and these doors will also permit access to the stalls when desired.

A car of this type will be comparatively inexpensive to manufacture and will embody numerous improvements over the ordinary stock cars in general use as it will permit the stalls to be increased or decreased in size as desired and when the troughs are raised will make one compartment of the entire interior of the car and adapt it for use in shipping merchandise of various kinds should it be desired to use the car for that purpose.

The ordinary stock car having fixed partitions and stalls can be used for transporting stock and for no other purpose and the partitions being fixed, there is no way to divide the car as it is loaded and keep each animal by itself. In this car valuable horses may be transported and cared for during the journey as easily and conveniently as when standing in a stable.

We claim as our invention:

1. A stock car having a series of transverse stalls and movable partitions dividing one stall from another, watering troughs hinged at both ends of each stall, whereby the animals can be watered while facing toward either side, the troughs of each stall being movable independently of the other troughs and capable of being tilted to discharge their contents or swung down to a horizontal position for use, a horizontal floor extending above the stalls and spaced from the top of the car and having a series of holes above said troughs, a water tank supported on said floor and a flexible hose attached to said tank and having a nozzle adapted to be thrust down through said holes to fill the troughs.

2. A stock car having a series of transverse stalls and movable partitions dividing one stall from another, watering troughs pivotally supported at both ends of each stall, and hay racks also supported at both ends of each stall whereby the animals can be fed and watered while facing toward either side, each watering trough being movable independently of the other troughs and capable of being tilted to a vertical position to discharge its contents or swung down to a horizontal position for use, a horizontal floor extending from end to end of the car above the stalls and spaced from the top of the car and forming a chamber wherein hay and feed may be stored, said floor having a series of holes above said watering troughs and racks, water tanks provided in said chamber at each end of the car and flexible hose attached to said tanks and having nozzles adapted to be thrust down through said holes to fill said troughs independently of one another, the hose for each tank being of sufficient length to reach all the troughs between that tank and the middle of the car, substantially as described.

3. A stock car having a series of transverse stalls and movable partitions dividing one stall from another, watering troughs hinged at both ends of each stall, whereby the animals can be watered while facing toward either side, the troughs of each stall being movable independently of all the other troughs and capable of being tilted to a vertical position to discharge their contents, or swung down to a horizontal position for use, a horizontal floor supported above said stalls and spaced from the car roof and forming a chamber wherein feed and water may be kept, said floor having a series of holes above said troughs, a water tank mounted on said floor, a flexible hose attached thereto and adapted to be thrust down through said holes to fill said troughs, rods pivotally attached to said troughs and projecting up through holes in said floor, and means whereby said rods may be locked when raised to support the said troughs in their dumping position.

4. A stock car having a series of transverse stalls and movable partitions dividing one stall from another, said partitions consisting of slats or bars, and sprocket chains connecting them one with another at the ends, vertical channel bar guides for said slats mounted on the sides of the car and in which guides said chains move, shafts having bearings in the upper walls of the car, sprocket wheels mounted on said shafts and arranged to engage said chains, a portion of one of the flanges of each bar near the top of the car being bent outwardly to expose the chains and permit the engagement of the sprocket wheels therewith, the ends of said shafts projecting through the car walls on one side and provided with suitable ratchet devices and having squared ends to receive an operating crank for raising or lowering said partitions.

5. A stock car having a series of transverse stalls and movable partitions dividing one stall from another, said partitions consisting of slats or bars and sprocket chains connecting them one with another at the ends, vertical channel bar guides for said slats at the sides of the car and in which guides said chains move, shafts having bearings in the upper walls of the car, sprocket wheels mounted on said shafts and arranged to engage the chains connecting said slats, a portion of one of the flanges of each guide bar being bent outwardly to expose the chain therein and permit the engagement of the sprocket wheels therewith, a series of idle wheels mounted on the outwardly bent portions of said flanges and engaging said slats and means for operating said shafts to raise or lower said partitions.

6. A stock car having a series of transverse stalls and movable partitions dividing one stall from another, watering troughs hinged in said stalls, the troughs of each stall being movable independently of the other troughs and capable of being tilted to discharge their contents or swung down to a horizontal position for use, a horizontal floor extending above the stalls and spaced from the top of the car and having a series of holes above said troughs, a water tank supported on said floor, and a hose attached to said tank and having a nozzle adapted to be thrust down through said holes to fill the troughs.

7. A stock car having a series of transverse stalls and movable partitions dividing one stall from another, watering troughs pivotally supported in said stalls, and hay racks also supported in said stalls, each watering trough being movable independently of the other troughs and capable of being tilted to a vertical position to discharge its contents or swung down to a horizontal position for use, a horizontal floor extending above the stalls and spaced from the top of the car and forming a chamber wherein hay and feed may be stored, said floor having a series of holes above said watering troughs and racks, a water tank supported on said floor, and a hose attached to said tank and having a nozzle adapted to be thrust down through said holes to fill the troughs, and said holes being of sufficient size to permit hay to be thrust therethrough into said racks, whereby each animal in the car can be fed and watered independently of the other animals in the car.

In witness whereof, we have hereunto set our hands this 21st day of May 1906.

FRANK CAMPBELL.
GEORGE E. WILSON.

Witnesses:
S. BLAIR McBEATH,
L. J. TAZENDIN.